Figure 1:
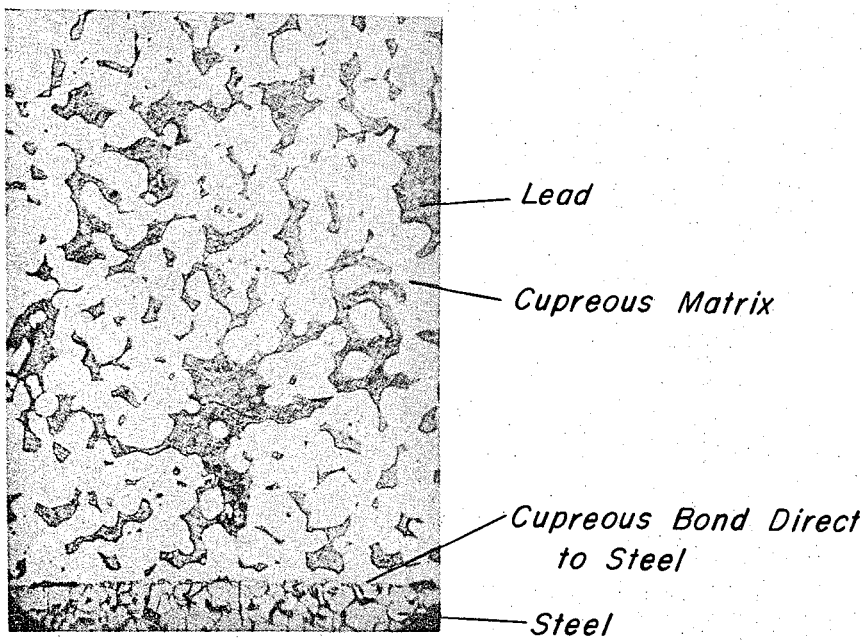

INVENTORS
Edward N. Smith
Ernst H. Ruf
Their Attorney

United States Patent Office 3,142,559
Patented July 28, 1964

3,142,559
METHOD OF MAKING A BEARING
Ernst H. Ruf and Edward N. Smith, Dayton, Ohio, assignors to General Motors Corporation, Detroit, Mich., a corporation of Delaware
Filed Nov. 3, 1960, Ser. No. 68,045
6 Claims. (Cl. 75—208)

This invention relates to metal structures and is particularly concerned with bearings and the like formed from metal powders and to the method for making same.

It is an object of the present invention to make an improved bearing or bearing layer wherein the starting ingredient is a copper-lead powder or powders or is a mixture of copper-lead powder in predominating quantities with a small quantity of tin powder.

A still further object of the invention is to make said bearing by sintering said copper-lead powder or mixture thereof with tin powder etc. on to a supporting surface, such as a steel supporting surface, wherein the bond formed between the sintered powder and the steel is a cupreous bond and wherein the lead which is initially present in the grains of powder exudes therefrom during the sintering process into the interstices within the cupreous matrix forming in situ a cupreous matrix impregnated with lead.

In order to attain the aforementioned object it is a still further object of the invention to process said metal powder or mixture of powders during the sintering operation under closely controlled conditions of atmosphere in order to create the cupreous bond and to cause the filling of the pores within the cupreous structure with lead.

In order to obtain this condition, the sintering atmosphere is of major importance to the success of the invention wherein incompletely burned natural gas or other non-oxidizing or reducing gas is used and wherein the dew point of the atmosphere is maintained below +10° F. and the gas is controlled so as to be as free of $CO_2$ as possible. $CO_2$ above .1% is unsatisfactory.

We have found that the presence of $CO_2$ and/or any substantial quantity of water vapor reduces the ability of the cupreous material to form a cupreous bond with the steel during sintering and also apparently reduces the wetting action of the lead to copper. The diffusion between adjacent particles of cupreous material is further inhibited to reduce the bond strength therebetween.

Further objects and advantages of the present invention will be apparent from the following description, reference being had to the accompanying drawings wherein preferred embodiments of the present invention are clearly shown.

Figure 2:
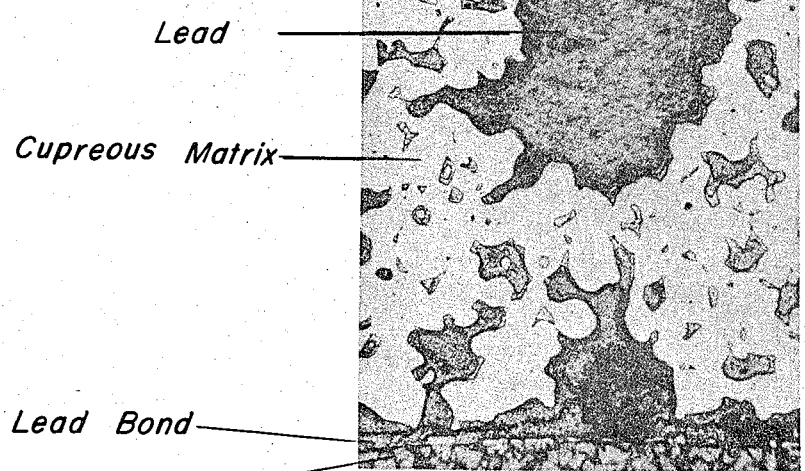

In the drawings:

FIG. 1 is a magnified cross section of the material made under the teachings of the present invention wherein a cupreous matrix bonded to a steel backing by a cupreous bond is present and wherein the pores of the matrix are substantially filled with lead, and FIG. 2 is the identical material made under identical conditions except for atmosphere which contains $CO_2$ and has a dew point of about 40° F. The lead bond is clearly apparent.

In Patent 2,585,430, issued to Alfred L. Boegehold and assigned to the assignee of the present invention, a method for making copper-lead bearings is disclosed using copper-lead together with a cupreous powder of higher melting point. In this patent normal non-oxidizing atmospheres are used during the sintering operation which atmospheres are termed in the trade "DX atmospheres" and are obtained by incompletely burning natural gas wherein the gas-air ratio varies from 6.1 to 6.8 parts of air to 1 part of gas. When natural gas is burned within these ratios the resultant DX gas contains between 5.1% and 6.9% of $CO_2$ and has a dew point in the order of 45° to 50° F. This gas also includes oxygen in the order of .02%, hydrogen in the order of 14.3% to 16.9% and carbon monoxide between 7.8% and 7.9%. Of course, these figures may vary slightly in accordance with the specific natural gas and DX generator being used. However, in all cases the gas includes a relatively high percentage of $CO_2$ and has a relatively high dew point.

In said Boegehold patent, therefore, the copper-lead powder in combination with other metal powders noted is sintered together and bonded to the steel by means of a lead and copper bond. The lead which is melted during the sintering operation flows over the cupreous matrix to form lead bonds and simultaneously, due to the high surface tension of the lead and low fluxing action of the gas, does not flow readily within the interstices which causes the sintered article to remain porous.

The Boegehold patent, in fact, suggests that where a solid bearing layer is desired, that this porous matrix formed from copper and lead should be subsequently impregnated with a white bearing metal to fill the pores and, if desired, to produce an overlay of the white metal over the matrix.

The present invention is directed to a great improvement over the article and method disclosed in said Boegehold patent wherein, due to exacting control of atmospheric conditions during the sintering operation it is possible to sinter the powder particles together with respect to the cupreous portions thereof, so that the particles are held together by cupreous bonds and are bonded to the steel by cupreous bonds and wherein the voids within the porous framework thus formed are substantially filled in situ with the lead material. We have found that lead or the lead ingredient cannot exceed 43% by weight of the material if a cupreous bond is to be maintained and this figure is, therefore, a limit with respect to the low melting point metal.

The following examples are representative of said mixes or conditions:

*Example I*

98% by weight of copper-lead powder (65% copper 35% lead) —100 mesh and 2% by weight of tin powder —100 mesh were mixed together to provide a uniform mixture. The mixture was spread in a noncompacted condition onto the surface of a steel strip and was scraped to a layer having a uniform thickness in the order of .0365 inch. The assembly was then sintered at temperatures ranging from 1660° F. to 1680° F. for a period from 6-20 minutes at heat.

The atmosphere used in the furnace during this sintering operation was incompletely burned natural gas wherein the starting product has an analysis of 94.1% methane with small quantities of $CO_2$, carbon dioxide, carbon monoxide, oxygen, hydrogen and nitrogen wherein the B.t.u. per cubic foot is in the order of 1100 to 1125. This gas was burned in a volume ratio of from 6.1 to 6.3 parts of air to 1 part of gas. This incompletely burned gas, as it left the generator, was passed through an absorption column of monoethanolamine to remove carbon dioxide and was then passed through a dessicating medium such as alumina or calcium chloride to reduce the water content to reduce the dew point of the gas to about —10° F. This atmosphere as mentioned before, is an important part of the invention and must be controlled with respect to carbon dioxide and water vapor as noted.

During the sintering operation the metal powder layer sintered together with respect to the cupreous portion of the metal powder particles to form a porous framework of cupreous metal bonded to the steel backing material by a cupreous bond. The lead that was present melted and flowed within the pores of the cupreous framework to substantially fill the same. During the sintering period, the thickness of the metal powder layer was reduced by about 40% of its original thickness.

It is apparent that the process may be practiced either on a batch, semicontinuous or continuous basis as desired.

*Example II*

A 100% copper-lead powder (65% copper 35% lead) was loosely spread on a surface of a steel strip and leveled off into a layer of about .05 inch thick. This strip with the copper-lead powder thereon was sintered at a temperature in the order of 1690° F. (−30+10° F.) for a period of about 6–15 minutes at temperature under specific non-oxidizing conditions (cracked ammonia atmosphere composed substantially of 75% hydrogen and 25% nitrogen).

In this instance the copper-lead layer sintered together with respect to the copper portion thereof into a copper framework bonded by a copper bond to the backing metal wherein the pores of the matrix were substantially filled with the lead. The thickness of the final layer was reduced about 40% of the original thickness.

*Example III*

An intimate mixture 99% copper-lead powder (70% copper and 30% lead) and 1% copper-tin alloy powder (50% tin and 50% copper), all powders passing through a 150 mesh screen was distributed without pressure onto a steel backing in a layer of approximately .030 inch thick. The assembly was then heated at a temperature in the order of 1700°–1750° F. for a period of about 15 minutes at temperatures in an atmosphere as disclosed in Example I. The powders sintered together to form a cupreous matrix bonded to the steel by a cupreous bond wherein the cupreous matrix was substantially filled with the lead or lead alloy as the case may be. During the sintering operation the thickness of the layer was reduced, due to shrinkage, in the order of 40%.

*Example IV*

50% copper-lead powder (65% copper 35% lead) and 50% copper-lead powder (76% copper 24% lead) of a particle size of about 100 mesh were thoroughly mixed and were loosely distributed in a layer approximately .030 inch thick on a steel strip. The assembly was processed at temperatures of 1700° to 1750° F. for about 15 minutes to form a lead impregnated cupreous sponge bonded to the metal backing and having a thickness in the order of .022 inch wherein the pores of the sponge were substantially filled with lead, all other controls being the same as noted in Example I.

*Example V*

50% copper-lead powder (65% copper 35% lead) 48% copper-lead powder (76% copper 24% lead) and 2% tin powder (mesh size of powders between 100 and 150 mesh), were mixed intimately and distributed without pressure onto the surfaces of a steel strip in a layer having a thickness of about .035 inch. This assembly was then sintered at a temperature in the order of 1620° F. to 1650° F. for 5 minutes at temperature in an atmosphere of pure hydrogen. During this sintering operation the metal powders formed a porous cupreous framework bonded to the steel backing by a cupreous bond wherein the pores of the framework were substantially filled with lead or lead alloy as the case may be. The thickness of the layer was reduced by about 43% during the sintering operation.

*Example VI*

The procedure as noted in Example I was repeated wherein the 2% tin was incorporated directly in the copper-lead powder as an alloying ingredient. A satisfactory material was formed.

*Example VII*

49% of copper lead powder (50% copper 50% lead) and 49% of copper lead powder (76% copper 24% lead) and 2% tin powder all having a particle size of about 100 mesh were mixed and loosely distributed in a layer having a thickness of about .0365 inch. The assembly was sintered under conditions and for the time noted in Example I and a satisfactory composite article was formed wherein a cupreous matrix was substantially filled with lead.

*Example VIII*

49% by weight of copper lead powder (50% copper 50% lead) and 52% of copper lead tin powder (74% copper 2% tin and 24% lead) were mixed together and distributed on a steel support and processed in exact accordance with Example VII. Satisfactory material was formed including a cupreous matrix having the lead substantially filling the pores thereof wherein the cupreous matrix was bonded by means of a cupreous bond to the steel supporting back.

It is apparent from the foregoing examples that a wide range of deviations is possible wherein copper-lead powder forms the basis for the powdered metal distributed upon the backing member. In all instances the backing member may be steel which has been suitably cleaned or it may be copper plated steel or any other suitably prepared backing material. In this connection we have found that if the steel is properly prepared and the sintering is carried out under proper atmospheric conditions no plating is necessary in order to obtain a satisfactory bond.

In all instances the strip having the lead impregnated cupreous sponge thereon is subsequently cut to proper width and formed into bearings, for example, bearings of the semi-cylindrical type wherein the formed bearings are suitably broached and/or machined to produce precision engine bearings. Fully cylindrical, split bearings, thrust surfaces, etc., may also be made by this process if desired.

Physical properties of material made in accordance with the foregoing examples shows great improvement over copper-lead bearing materials made by the usual powder metallurgical practices. For example, the shear values are considerably higher due to the fact that a cupreous bond is provided as the bonding medium between the bearing layer and the steel. Furthermore, the bearing performance obtained from bearings made from the material is extremely high. Bearings made by the process disclosed when used as main and connecting rod bearings in an automotive engine showed 100% improved durability over conventional sintered copper-lead bearings. Similar bearings made by conventional processes failed below 100 hours. Furthermore, the bearing is less expensive to manufacture than the usual type of sintered metal bearing due to the fact that the bearing is self impregnated during the sintering operation thereby eliminating the costly and tedious impregnation step which has heretofore been necessary as set forth in the Boegehold patent.

In general, the bearing is improved functionally and is less expensive to manufacture than bearings heretofore made utilizing copper-lead or other powdered metals requiring a Babbitt or lead impregnant.

Small additions of antimony or zinc may also be included if desired. These are most conveniently added to the copper prior to or during the formation of the copper-lead powder. Additions of these and other suitable metals may be used up to 2% by weight of the copper without effecting the highly desirable qualities of the bearing.

Plating of the bearing surface after machining is also contemplated. In this instance about .0005 inch of indium or tin plated onto the bearing forms an excellent surface. Other metals may be used as a plating material for special purposes as desired and in no case should the plated layer be over .001 inch thickness.

In place of plating the finished machined bearing material, preferably in strip form, may be passed through a bath of a molten metal such as tin antimony indium alloys of the aforementioned with lead, etc. Control of the period of immersion will determine the extent of diffusion of the molten metal into the lead and this may be determined by trial to obtain the desired result.

In the claims to follow the term "lead containing material" embraces pure lead and lead alloys as disclosed wherein lead makes up the major portion of the alloy.

It is to be understood that if a cupreous sponge impregnated or filled with a lead material is desired without a backing, the sintering of the non-compacted copper-lead powder etc. may be carried out on a non-adhering supporting surface such as oxidized chrome steel, graphite, etc. In this case the cupreous portions of the powder will sinter together and the lead ingredient will melt and cause self-impregnation to substantially fill the porous structure of the cupreous matrix. In this instance the actual density of the completed material is in the order of 95% and above the theoretical density of the materials making up the structure.

While the embodiments of the present invention as herein disclosed, constitute preferred forms, it is to be understood that other forms might be adopted.

What is claimed is as follows:

1. A method for forming a bearing having a porous cupreous framework bonded to a strong metal supporting back by means of a cupreous bond and wherein the pores of said matrix are filled with a lead containing material, the steps comprising; distributing upon the surface of a strong metal backing member a cupreous metal-lead powder (wherein the cupreous metal forms at least 57% by weight of each powder particle) in a thin level layer, sintering assembly at a temperature above the melting point of lead and below the melting point of the cupreous metal for a period sufficient to melt the lead containing material and under non-oxidizing conditions wherein carbon dioxide does not exceed .1% and wherein the atmosphere has a dew point of less than +10° F. for causing the cupreous metal-lead powder to sinter together and form cupreous bonds between adjacent particles and to the strong metal supporting back and to cause the lead containing material to exude from the cupreous metal-lead particles and substantially fill the interstices of said matrix.

2. The method as claimed in claim 1 including the added steps of machining the matrix and then plating the machined surface thereof with a layer of a metal taken from the group consisting of tin, indium, lead and alloys thereof, said overlay having a thickness not over .001 inch.

3. A method for forming a bearing having a porous cupreous framework bonded to a strong metal supporting back by means of a cupreous bond and wherein the pores of said matrix are filled with a lead containing material, the steps comprising; distributing upon the surface of a strong metal backing member a mixture of metal powders consisting of 98% by weight of copper-lead powder (65% copper 35% lead) and up to 2% by weight of tin powder, said mixture being distributed in a thin layer, sintering the assembly at a temperature above the melting point of lead and tin and below the melting point of copper for a period sufficient to melt the lead and tin and under non oxidizing conditions wherein carbon dioxide does not exceed .1% and wherein the atmosphere has a dew point of less than +10° F. for causing the copper-lead powder and tin to sinter together and form cupreous bonds between adjacent particles thereof and to sinter to the strong metal supporting back by means of a cupreous bond and to cause the lead containing material to exude from the copper-lead particles and to substantially fill the interstices of the matrix.

4. The method as claimed in claim 3 including the added step of machining the surface of the sintered matrix and plating said machined surface with a bearing metal.

5. A method for forming a bearing having a porous cupreous framework bonded to a strong metal supporting back by means of a cupreous bond and wherein the pores of said matrix are filled with a lead containing material, the steps comprising; distributing upon the surface of a strong metal backing member a mixture of 49% copper-lead powder (50% copper 50% lead), 49% copper-lead powder (76% copper 24% lead) and up to 2% tin powder in a thin level layer, sintering the assembly at a temperature above the melting point of lead and tin and below the melting point of copper for a time sufficient to melt the lead containing material and the tin powder and under non oxidizing conditions wherein carbon dioxide does not exceed .1% and wherein the atmosphere has a dew point of less than +10° F. for causing the copper-lead powders and the tin powder to sinter together and form cupreous bonds between adjacent particles and to bond to the strong metal supporting back by means of a cupreous bond, and to cause the lead containing material to exude from the copper-lead particles and to substantially fill the interstices of the matrix.

6. The method as claimed in claim 5 plus the added steps of machining the surface of the matrix and then plating the surface of the matrix with a bearing metal.

References Cited in the file of this patent

UNITED STATES PATENTS

| | | |
|---|---|---|
| 2,096,252 | Koehring | Oct. 19, 1937 |
| 2,198,253 | Koehring | Apr. 23, 1940 |
| 2,222,251 | Calkins et al. | Nov. 19, 1940 |
| 2,234,371 | Fetz | Mar. 11, 1941 |
| 2,585,430 | Boegehold | Feb. 12, 1952 |
| 2,986,464 | Lewis et al. | May 30, 1961 |

OTHER REFERENCES

"Product Engineering," October 1943, pp. 630, 631.

Goetzel: "Treatise on Powder Metallurgy," vol. 1, 1949, p. 640, pp. 475–479.